(12) United States Patent
De Angelis et al.

(10) Patent No.: US 7,550,132 B2
(45) Date of Patent: *Jun. 23, 2009

(54) PROCESS FOR THE PRODUCTION OF SULFUR, STARTING FROM THE HYDROGEN SULPHIDE CONTAINED IN THE NATURAL GAS, OR IN THE ASSOCIATED GAS AND POSSIBLE DISPOSAL OF THE THUS OBTAINED SULFUR

(75) Inventors: Alberto De Angelis, Legnano (IT); Mauro Palazzina, Piacenza (IT); Paolo Pollesel, San Donato Milanese (IT); Sandra Cobianco, Fara Gera d'Adda (IT); Thomas Paul Lockhart, Lodi (IT)

(73) Assignee: ENI S.p.A., Rome (IT)

( * ) Notice: Subject to any disclaimer, the term of this patent is extended or adjusted under 35 U.S.C. 154(b) by 156 days.

This patent is subject to a terminal disclaimer.

(21) Appl. No.: 10/594,759

(22) PCT Filed: Mar. 9, 2005

(86) PCT No.: PCT/EP2005/002592

§ 371 (c)(1),
(2), (4) Date: Jan. 18, 2007

(87) PCT Pub. No.: WO2005/095271

PCT Pub. Date: Oct. 13, 2005

(65) Prior Publication Data

US 2007/0160523 A1 Jul. 12, 2007

(30) Foreign Application Priority Data

Mar. 31, 2004 (IT) .......................... MI2004A0646

(51) Int. Cl.
*C01B 17/04* (2006.01)
*C10L 3/10* (2006.01)

(52) U.S. Cl. ................. 423/574.1; 423/542; 423/576.2; 423/576.4; 48/127.3; 48/127.5; 48/127.7

(58) Field of Classification Search ................. 423/542, 423/574.1, 576.2, 576.4; 48/127.3, 127.5, 48/127.7

See application file for complete search history.

(56) References Cited

U.S. PATENT DOCUMENTS

| 2,043,084 | A | | 6/1936 | Ward et al. |
| 2,724,641 | A | | 11/1955 | Butler et al. |
| 3,104,951 | A | * | 9/1963 | Urban ...................... 423/576.4 |
| 3,891,743 | A | | 6/1975 | Block et al. |
| 5,378,441 | A | * | 1/1995 | Frankiewicz et al. ........ 423/220 |
| 5,753,189 | A | * | 5/1998 | Rehmat ...................... 422/110 |
| 5,876,677 | A | | 3/1999 | Mensinger et al. |
| 6,063,357 | A | | 5/2000 | Boucot et al. |
| 6,096,280 | A | | 8/2000 | Ellenor et al. |

FOREIGN PATENT DOCUMENTS

WO 03 082455 10/2003

* cited by examiner

*Primary Examiner*—Timothy C Vanoy
(74) *Attorney, Agent, or Firm*—Oblon, Spivak, McClelland, Maier & Neustadt, P.C.

(57) ABSTRACT

Process for the production of sulfur, obtained in pure form, and possibly easily disposable even at ambient temperature, starting from hydrogen sulphide contained in natural gas, which includes: a) oxidizing a portion of hydrogen sulphide to sulfur dioxide; b) dissolving in water the sulfur dioxide obtained in step (a); c) carrying out the reaction (I): $2H_2S + SO_2 \rightarrow 3S + 2H_2O$ (I) making the remaining hydrogen sulphide to react with the solution prepared in step (b); and d) using the thus obtained sulfur suspension for the production sulfur or, alternatively, to use it for the disposal of the sulfur itself in a site reserved for such purpose.

16 Claims, 5 Drawing Sheets

Granulometric Distribution (differential and cumulative) of the sulfur sample with concentration 0.1 w/w.

Granulometric Distribution (differential and cumulative) of the sulfur sample with concentration 0.1 w/w after treatment with ultrasounds (10min).

Granulometric Distribution (differential and cumulative) of the sulfur sample with concentration 1 w/w.

Granulometric Distribution (differential and cumulative) of the sulfur sample with concentration 1 w/w after treatment with ultrasounds (10 min).

Granulometric Distribution (differential and cumulative) of the sulfur sample with concentration 1 w/w filtered through the 35 micron porous septum.

PROCESS FOR THE PRODUCTION OF SULFUR, STARTING FROM THE HYDROGEN SULPHIDE CONTAINED IN THE NATURAL GAS, OR IN THE ASSOCIATED GAS AND POSSIBLE DISPOSAL OF THE THUS OBTAINED SULFUR

This application is a national stage filing of PCT/EP05/002592.

The present invention refers to a process for the production of sulfur, starting from hydrogen sulphide contained in natural gas.

More in detail, the present invention refers to a process for the production of sulfur as a water suspension in view of its obtainment as pure sulfur or of its possible disposal.

Sulfur, as $H_2S$, can be found even in relevant quantities, both in the extracted crude oil and in its associate gas. As the hydrogen sulphide is a contaminating substance, which must be eliminated before the combustion of the methane itself, its presence will be a problem as more relevant, from an economic point of view, as greater is the quantity of hydrogen sulphide. In fact, if its presence is of the order of a few parts per million, the additional cost for its treatment will be negligible, but when its content reaches higher levels the cost relevance becomes more and more important, becoming prohibitive when the hydrogen sulphide exceeds the 15-20% of the gaseous mixture.

The natural gas containing relevant hydrogen sulphide quantities (acid gas) is treated with a solution capable of selectively absorbing the $H_2S$, as for instance an alcanolamine solution, thus obtaining a gaseous mixture of hydrocarbons which can be used as fuel, without any problem from an environmental point of view.

By means of desorbiment by the alcanolammine solutions, pure $H_2S$ is obtained, which can then be transformed into sulfur by means of the Claus process. However, the application of such process becomes economically convenient only when high volumes of hydrogen sulphide are treated, and the hydrogen sulphide concentration is at least of 5%.

Moreover, the Claus process introduces non-negligible costs of construction and management of the plant, to produce a material whose supply greatly exceeds the demand. Currently, in fact, in the sulfur market the offer of the product exceeds the demand, and the projections of the market, for the next five years, indicate a further widening of the gap between supply and demand. The ever increasing offer of sulfur is due, for a non negligible part, to the exploitation of new oil and natural gas fields that are characterized by a high content of compounds which include sulfur.

Therefore, the problem is that to devise a method to transform the hydrogen sulphide into elementary sulfur, also when the Claus process is not economically interesting and, furthermore, of identifying a system for the disposal of sulfur when the market shows a low demand for it.

Currently, the produced sulfur, which does not find an immediate market, is stocked in the shape of big blocks of great dimensions in enormous stocking sites in open spaces. Such stocking creates remarkable problems from an environmental point of view, because the sulfur is subject to erosion by the atmospheric agents and therefore can be spread on a wide area surrounding the stocking zone. Moreover, because of the activity of microorganisms present on the surface of the sulfur itself, a transformation of sulfur in sulfuric acid takes place, with the subsequent acidification of the surrounding land.

The ideal situation would be that of being able to shelter the sulfur from the atmospheric agents, as can be the case of underground disposal in suitable geologic structures. In this case, though, the problem arises of how to inject sulfur in said structures, due to the sulfur high melting point (119° C.).

Further examples are disclosed in U.S. Pat. No. 2043084 concerning a reaction between hydrogen sulfide and sulfur dioxide into elemental sulfur whereby the reaction is performed in aqueous solution. A similar process is disclosed in U.S. Pat. No. 6096280. U.S. Pat. No. 5876677 concerns a process disclosing the use of ultrasonic treatment of sulfur suspension and U.S. Pat. No. 2724641 discloses the use of elemental sulfur derived by the oxidation of gaseous hydrogen sulfide.

Applicants have now found a process to produce sulfur present as $H_2S$ in natural gas by means of a process, alternative to the Claus process, which envisages the synthesis of sulfur in a water suspension form that can then be used to obtain sulfur of high purity or be employed to dispose of the sulfur in sites especially reserved for such purpose.

Therefore, the scope of the present invention is a process for the production of sulfur starting from the hydrogen sulphide contained in natural gas, which includes:

a) oxidizing part of the hydrogen sulphide to sulfur dioxide;
b) dissolving in water the sulfur dioxide obtained in step (a);
c) carrying out the reaction (I):

$$2H_2S + SO_2 \rightarrow \rightarrow 3S + 2H_2O \qquad (I)$$

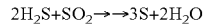

making the remaining hydrogen sulphide to react with the solution prepared in step (b), thus obtaining a suspension of sulfur in water; and d) recovering the sulfur from the suspension, through common methods like filtration, centrifugation or precipitation, or, alternatively, using the so obtained suspension, for the disposal of the sulfur, by means of its injection in sites especially reserved for such purpose.

According to the present invention, the hydrogen sulphide can be recovered from the natural gas by conventional methodologies, for instance by absorption with amines. These technologies allow to obtain $H_2S$ streams with purity higher than 90%. Part of the $H_2S$ stream, thus obtained, between 5% and 35% in volume of the total, is oxidized to $SO_2$, which is then dissolved in water and made to react with $H_2S$ even at a temperature equal or below ambient temperature (T=20° C.), thanks to the high solubility in water of the $SO_2$ gas (22.8 g of $SO_2$ in 100 g of distilled water at 0° C.).

As an alternative to the above process scheme, it is possible to treat with absorbent amine solutions only a third of the stream of natural gas when the concentrations of hydrogen sulphide are high greater than 1%.

According to such an alternative process scheme, one third of the gas stream is treated with alcanolamines, obtaining a stream of concentrated hydrogen sulphide, which is oxidized to sulfur dioxide and then absorbed in water. Such water solution of $SO_2$ is then placed in contact with the gas stream, constituted by the ⅔ of the initial $H_2S$ stream in the natural gas. Thus, the hydrogen sulphide reacts with the sulfur dioxide originating the suspension of sulfur in water, while the natural gas exits purified from the reactor.

For these processes, oxidation to $SO_2$ can be carried out using either air, enriched air or oxygen. If air is used, contamination of the natural gas with the inert components of air (mostly nitrogen gas) can be avoided, when desired, by absorbing $SO_2$ in water. With this separation step, it is possible to employ air without impact on the value of the treated natural gas.

According to a further alternative process scheme, the treatment with alcanolamine solutions can be avoided in case of high hydrogen sulphide concentrations, greater than 2%.

According to such second alternative process scheme, one third of the gas stream is treated with a quantity of oxygen (furnished as air, enriched air or oxygen) lower than the one required for the total combustion, oxidizing the hydrogen sulphide to $SO_2$, but substantially not burning the methane. This can be carried out using a catalyst which oxidises selectively $H_2S$ in the presence of $CH_4$, such as recently reported in the international patent application WO 03/082455. Said catalyst consists essentially of $Nb_2O_5$ and/or $CeO_2$ and/or $MoO_3$ supported onto $TiO_2$.

The choice of air, enriched air, oxygen as the oxydant will be determined by the amount of inert gasses which can be tolerated in the natural gas following treatment. For example, if the limit of the inert gas in the natural gas is 4%, then using air (21% volume of oxygen) to treat one third of the total $H_2S$ in the natural gas, the 4% limit of inerts will be reached with 2.1 of $H_2S$. Higher concentration can be treated employing enriched air or, in the final instance, pure oxygen. One versed in the state of the art will optimize the process on the basis of economics.

The gas stream obtained in such manner, mainly containing methane, $SO_2$ and small quantities of $CO_2$, is put in contact with cold water which easily absorbs the sulfur dioxide, creating a stream of methane (with traces of $CO_2$) and a water solution of $SO_2$ respectively. The remaining gas stream, constituted by ⅔ of the initial stream of $H_2S$ in the natural gas, is then placed in contact with said water solution of $SO_2$. In such a way, the hydrogen sulphide reacts with the sulfur dioxide originating the suspension of sulfur in water, while the natural gas exits purified from the reactor.

The above process for recovering the sulfur present as $H_2S$ in natural gas, with its possible alternatives, is characterized by some very meaningful advantages:
1. Highly pure sulfur is obtained, which can be recovered from the dispersion in water (with common methods as filtration, centrifugation or flocculation). The particular quality of this sulphur, its high dispersability in water, promotes its use in the agricultural field, a market under development. Furthermore, the favourable behaviour of this sulphur in water is different from the behaviour of sulphur obtained from the conventional Claus process which requires the use of additive for its dispersion in water.
   The dispersion obtained according to the present invention can be pumped into deposits even at a temperature lower than the melting point of sulfur itself and close or equal to ambient temperature;
2. The fluid used to obtain the suspension (water) has almost zero environmental impact. Indeed, if the water produced together with the hydrocarbons is used as water for the absorption of $SO_2$, the disposal by injection of the sulfur suspension removes also this pollutant;
3. It is not necessary to have a Claus plant to transform hydrogen sulphide in sulfur because a simple burner is sufficient to oxidize to $SO_2$, by combustion, part (up to ⅓) of the hydrogen sulphide. Therefore the process is economic and can also be applied in remote areas. Moreover, with the previously illustrated alternative process schemes, it is possible to reduce, partly or completely, the treatment of the gas with absorbent amines, therefore further abating the cost of the process;
4. The sulfur which has been disposed in deposits, by means of the water suspension produced by the process object of the present invention can, if necessary, be recovered from the geologic structure in case the market changes and makes it viable to commercialize the sulfur.

Another interesting aspect of the present sulfur disposal process is that the obtained suspensions are constituted by particles of small dimension, which can be directly pumped into the porous matrix of suitable geologic structures, not necessarily in fractures or under conditions of hydraulic fracturing.

If it is desired to further increase the stability of the water suspension, additives absolutely not toxic can be added in small quantity and, therefore, with zero environmental impact, capable of guaranteeing the stability of said suspension for a very long period.

A typical example of said additives is constituted by a stabilized emulsion of 0.1% in weight of Agar-agar, a natural product commonly used in the food industry, which stabilizes the sulfur suspensions in water for very long periods.

Following, we report, for purpose of illustration only and not of limitation, some examples of synthesis of the suspension of sulfur in water, according to the present invention, and some examples of the determination of the dimension of its particles by means of a laser diffraction granulometer, as well as some examples of filtration of the suspension obtained in said manner, through porous septa with known dimension of their pores.

The diagrams of FIGS. 1-5 are associated to the examples, respectively representing:

EXAMPLE 1

32 g of sulfur dioxide (equal to 0.5 moles) are dissolved in 500 milliliter of distilled water at 0° C., while mixing. Subsequently, a stream of $H_2S$ at 10% in nitrogen with a flow of 300 ml/h, is scrubbed for a total period of 12 hours (equal to 16.6 moles). A stable suspension of sulfur in water is formed, with a milky appearance, according to the following reaction:

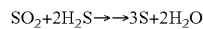

$$SO_2 + 2H_2S \rightarrow \rightarrow 3S + 2H_2O$$

At the end of the 12 hours, pure nitrogen is made to flow in the suspension, to remove all traces of dissolved sulfur gases possibly present. The obtained suspension has a sulfur content equal to 0.1% in weight.

The granulometric distribution (PSD) of sulfur particles of such suspension is determined by means of a laser diffraction granulometer (COULTER model LS730). The instrument, which uses a solid state laser with a 750 nm wavelength, allows us to obtain a measuring interval comprised between 0.04 and 2000 μm. The elaboration of the scattering signal has been carried out applying the Mie optical model. The granulometric analysis has been carried out both on the sample as it was and also after having treated it with ultrasonics for 10 min. to reveal a possible tendency of the sulfur particles to aggregate.

Figure 1:
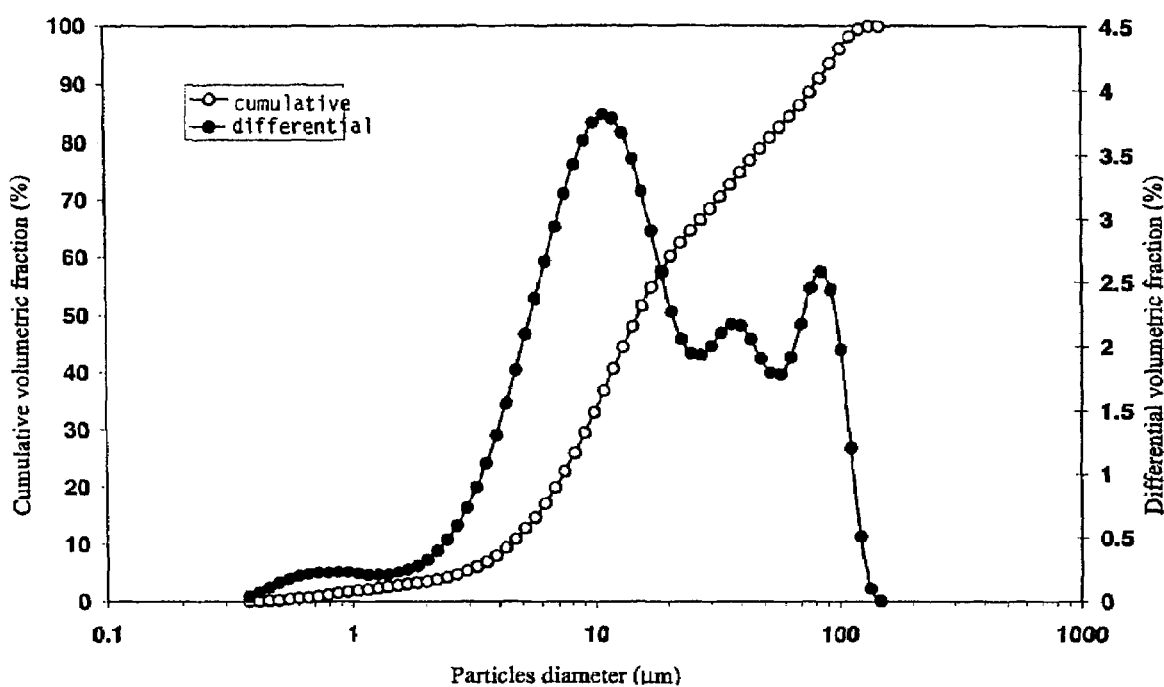
FIG. 1 represents the granulometric distribution (differential and cumulative) of the sulfur sample with concentration in water of 0.1% in weight.

In particular, in FIG. 1, a rather wide granulometric distribution of aggregates is observed (from 5 micrometers to 100 micrometers), while the particles that have been disaggregated because of the treatment with ultrasonics have dimensions centered around values of 4 micron.

EXAMPLE 2

70 g of sulfur dioxide (equal to 1.09 moles) are dissolved in 500 milliliter of distilled water at 0° C., while mixing. Subsequently, a stream of $H_2S$ at 10% in nitrogen with a flow of 1200 ml/h is scrubbed for a total period of 20 hours (equal to 0.107 moles). A stable suspension of sulfur in water is obtained, with a milky appearance, according to the following reaction

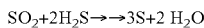

At the end of the reaction, pure nitrogen is made to flow in said suspension to remove all traces of dissolved sulfur gases still present. The obtained suspension has a sulfur content equal to 1.03% in weight.

As in example 1, for said suspension we determine the granulometric distribution of particles both for the suspension as is and also for the suspension treated with ultrasonics for 10 min.

Figure 3:
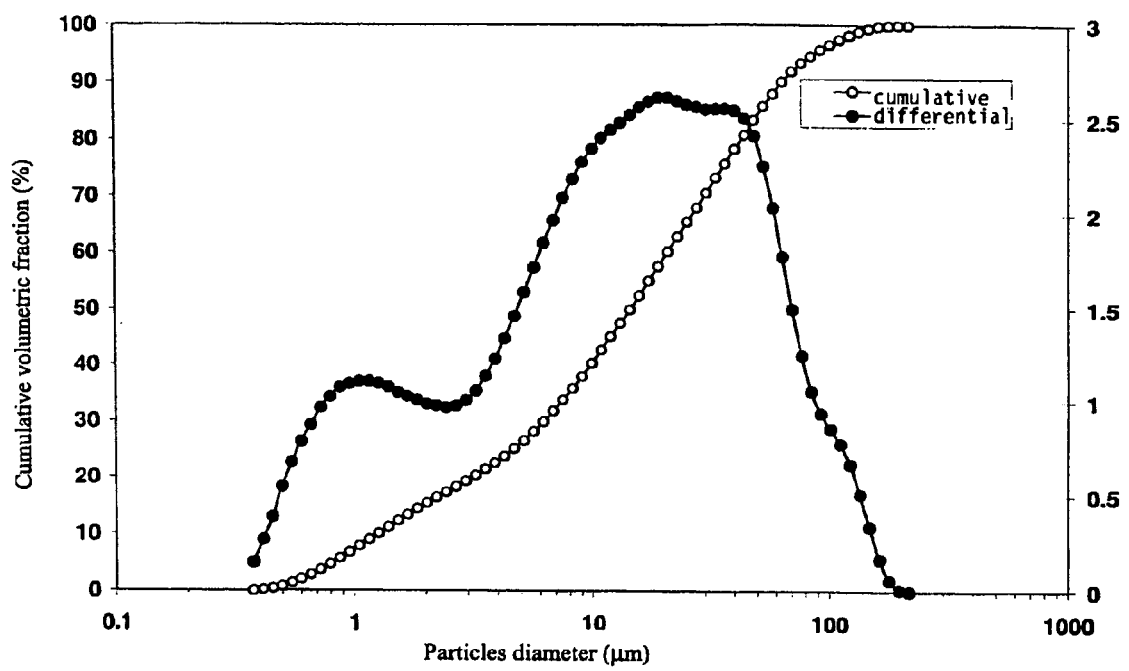
FIG. 3 represents the granulometric distribution (differential and cumulative) of the sulfur sample with concentration in water of 1% in weight.

The granulometric distribution of said suspension appears wider than the one relative to the suspension obtained in example 1 (see FIG. 3 and FIG. 1), but anyway the treatment with ultrasonics permits the disaggregation of the larger aggregates, formed during the reaction (I), and obtains sulfur particles with dimensions centered around 7-8 micron.

EXAMPLE 3

Figure 5:
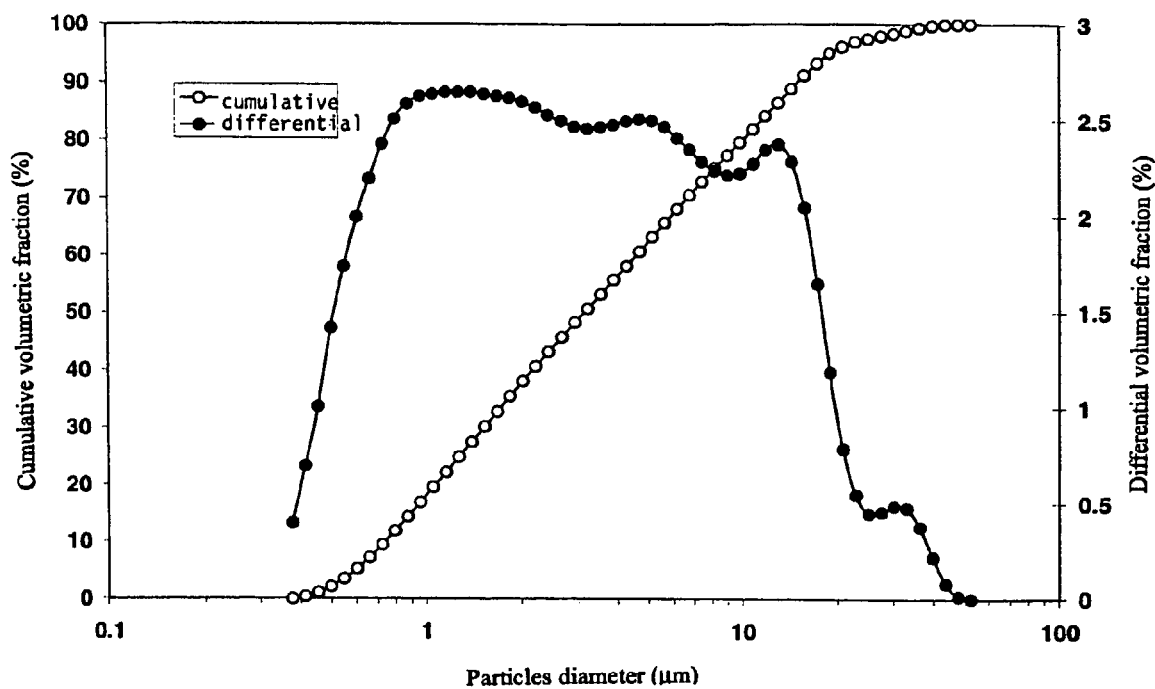
FIG. 5 represents the granulometric distribution (differential and cumulative) of the sulfur sample with concentration in water of 1% in weight, filtered through a porous septum of 35 μm.

A sulfur suspension in water at a concentration of 1% in weight is filtered through porous septa. The experiment has been carried out using a dynamic filter-press which, operating in mixing conditions, permits the simulation of the filtration of a sulfur suspension through a porous medium with characteristics similar to those of the rocks in which the permanent stocking of sulfur is foreseen. The filtration test has been carried out at ambient temperature (25° C.), applying a pressure differential equal to 2 bars and using, as porous media, two aloxite porous septa with known pores diameter equal, respectively, to 35 micrometers and 10 micrometers. The test has been carried out in two phases:
1. filtration of the sulfur suspension of 1% in weight, through the porous septum with pores diameter of 35 micrometers, characterized by the granulometric distribution of FIG. 3 (as is);
2. filtration of the sulfur suspension filtered through the septum of 35 micrometers, through the porous septum with diameter of the pores of 10 micrometers, and characterized by the granulometric distribution of FIG. 5 (as is).

The filtration, for both phases, is practically instantaneous and, at least for the concentration that has been used (1% in weight), neither after the first phase of filtration nor after the second any formation of a film on the porous septum is observed. Sulfur traces, barely visible, on the septum indicate that the greater part of sulfur particles goes through the porous medium.

Therefore, these results highlight the possibility of injecting a sulfur suspension, with a concentration equal to 1% in weight, into a porous matrix without the formation of a waterproof film on the surface of the porous medium, which could block the injection.

Figure 2:
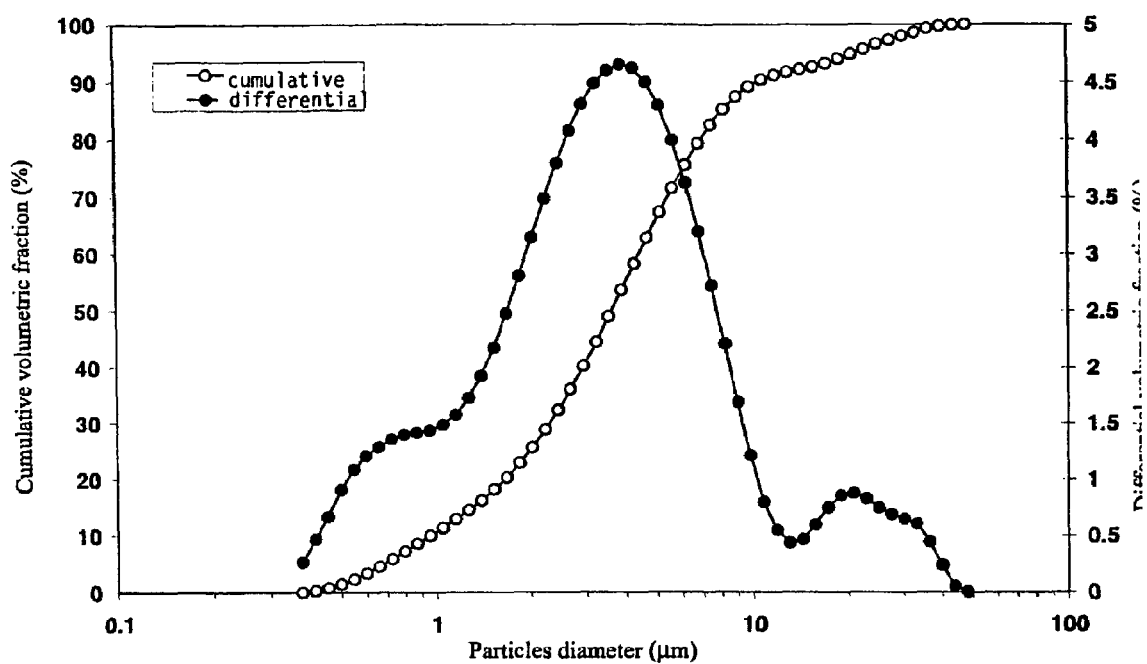
FIG. 2 represents the granulometric distribution (differential and cumulative) of the sulfur sample with concentration in water of 0.1% in weight, after treatment with ultrasonics (10 minutes)
Figure 4:
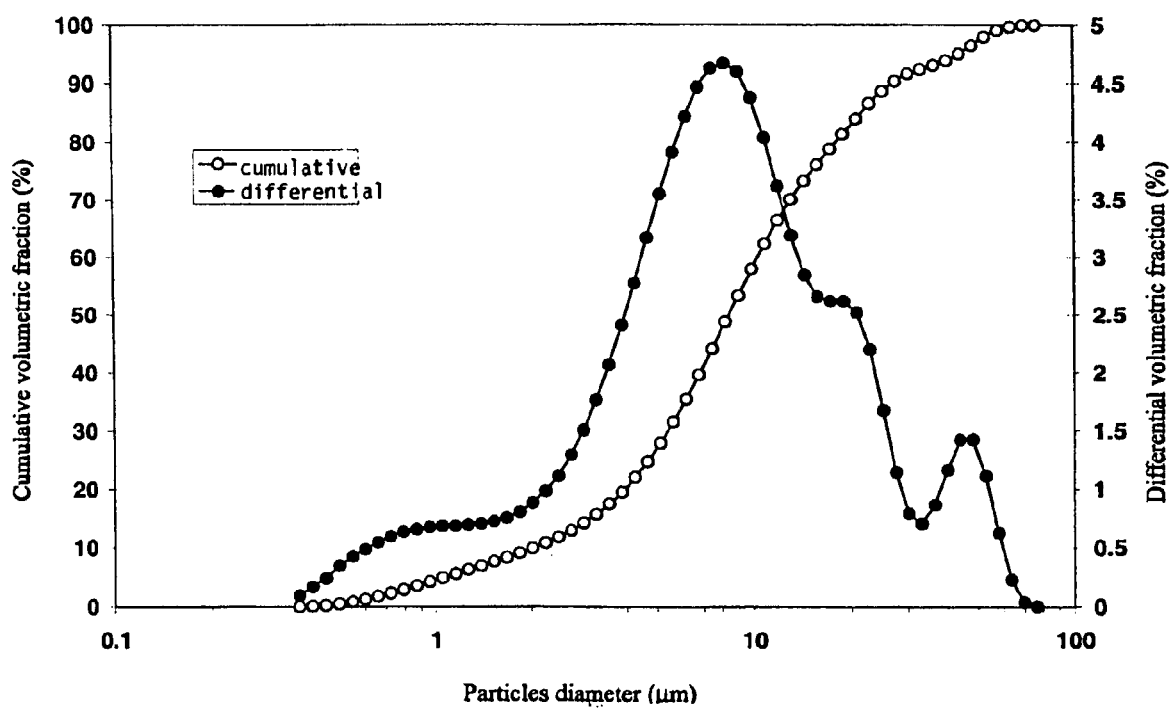
FIG. 4 represents the granulometric distribution (differential and cumulative) of the sulfur sample with concentration in water of 1% in weight, after treatment with ultrasonics (10 minutes)

It is important to emphasize that the filtration tests have been carried out on the suspensions as they were, without treatment with ultrasonics which, as shown in FIGS. 2 and 4, has the ability to disaggregate the sulfur aggregates. Therefore, if it were possible to apply an ultrasonics treatment to the sulfur suspension produced according to method of the present invention, we would obtain particles with such dimensions as to allow the complete filtration even through porous matrices characterized by very small pores (with diameters smaller than 10 micrometers).

The invention claimed is:

1. A process for the production of sulfur starting from hydrogen sulphide contained in natural gas, which comprises:
   a) oxidizing part of the hydrogen sulphide to sulfur dioxide;
   b) preparing a solution by dissolving in water the sulfur dioxide obtained in (a);
   c) carrying out the following reaction (I):

by reacting hydrogen sulphide remaining in the natural gas with the solution prepared in (b) to provide a sulfur suspension; and
   d) isolating sulfur from the sulfur suspension or, alternatively, disposing of said sulfur suspension in a site reserved for such purpose,
   wherein the hydrogen sulphide is oxidized to $SO_2$, by directly burning a mixture of methane and hydrogen sulphide as it exits from an extraction well, without pretreatment with alkanolamine, in the presence of a substoichometric quantity of oxygen.

2. The process, according to claim 1, wherein the hydrogen sulphide is recovered from the natural gas by means of absorption with amines.

3. The process, according to claim 2, wherein sulfur is isolated from the sulfur suspension.

4. The process, according to claim 1 or 2, wherein the hydrogen sulphide has a concentration higher than 90%.

5. The process, according to claim 4, wherein sulfur is isolated from the sulfur suspension.

6. The process according to claim 1, wherein the oxidation is carried out in the presence of a catalyst consisting essentially of $Nb_2O_5$ and/or $CeO_2$ and/or $MoO_3$ supported onto $TiO_2$.

7. The process, according to claim 1, wherein the reaction mixture containing $SO_2$ is bubbled through a layer of water.

8. The process, according to claim 7, wherein the natural gas containing hydrogen sulphide is subsequently bubbled in the sulfur dioxide solution in water, obtaining the formation of a stable suspension of sulfur in water.

9. The process, according to claim 1, wherein the reaction (I) takes place at a temperature equal to or lower than room temperature.

10. The process, according to claim 1, wherein the sulfur suspension is treated by ultrasounds, with the effect of disaggregating it, decreasing the dimension of its particles and increasing its stability over time.

11. The process, according to claim 1, wherein sulfur is isolated from the sulfur suspension.

12. A process for the production of sulfur starting from hydrogen sulphide contained in natural gas, which includes:
   a) oxidizing part of the hydrogen sulphide to sulfur dioxide;

b) preparing a solution by dissolving in water the sulfur dioxide obtained in (a);

c) carrying out the following reaction (I):

$$2H_2S + SO_2 \rightarrow 3S + 2H_2O \quad (I)$$

by reacting hydrogen sulphide remaining in the natural gas with the solution prepared in (b) to provide a sulfur suspension;

wherein the suspension of sulfur is disposed in a geologic structure by injection in a porous matrix or a fracture or by injection under hydraulic fracturing conditions, at a temperature lower than the melting point of sulfur.

13. The process, according to claim 12, wherein the suspension of sulfur in water is disposed in a geologic structure, by injection in a fracture.

14. The process, according to claim 12, wherein the suspension of sulfur in water is disposed in a geologic structure by injection under hydraulic fracturing conditions.

15. The process according to claim 12, wherein the suspension of sulfur in water is disposed in a geologic structure by injection in a porous matrix.

16. A process for the production of a sulfur suspension starting from hydrogen sulphide contained in natural gas, which comprises:

a) oxidizing part of the hydrogen sulphide to sulfur dioxide;

b) preparing a solution by dissolving in water the sulfur dioxide obtained in (a);

c) carrying out the following reaction (I):

$$2H_2S + SO_2 \rightarrow 3S + 2H_2O \quad (I)$$

by reacting hydrogen sulphide remaining in the natural gas with the solution prepared in (b) to provide the sulfur suspension, wherein the hydrogen sulphide is oxidized to $SO_2$, by directly burning a mixture of methane and hydrogen sulphide as it exits from an extraction well, without pretreatment with alkanolamine, in the presence of a substoichometric quantity of oxygen.

* * * * *